United States Patent [19]
Ruch et al.

[11] Patent Number: 5,561,286
[45] Date of Patent: Oct. 1, 1996

[54] SCINTILLATION PROBE WITH PHOTOMULTIPLIER TUBE SATURATION INDICATOR

[75] Inventors: Jeffrey F. Ruch, Bethel Park; David J. Urban, Glassport, both of Pa.

[73] Assignee: The United States of America as represented by the United States Department of Energy, Washington, D.C.

[21] Appl. No.: 442,449

[22] Filed: May 16, 1995

[51] Int. Cl.$^6$ .................................................. G01T 1/208
[52] U.S. Cl. ........................................ 250/207; 250/252.1
[58] Field of Search ............................ 250/207, 214 VT, 250/336.1, 370.11, 370.12, 370.13, 375, 374, 252.1, 361 R; 313/532, 533, 534, 535, 536, 523, 524

[56] References Cited

U.S. PATENT DOCUMENTS

| | | | |
|---|---|---|---|
| 4,661,693 | 4/1987 | Masanobu | 250/207 |
| 5,128,546 | 7/1992 | Nam et al. | 250/361 R |
| 5,237,173 | 8/1993 | Stark et al. | 250/207 |

*Primary Examiner*—Edward P. Westin
*Assistant Examiner*—John R. Lee
*Attorney, Agent, or Firm*—John T. Lucas; William R. Moser; Paul Gottlieb

[57] ABSTRACT

A photomultiplier tube saturation indicator is formed by supplying a supplemental light source, typically an light emitting diode (LED), adjacent to the photomultiplier tube. A switch allows the light source to be activated. The light is forwarded to the photomultiplier tube by an optical fiber. If the probe is properly light tight, then a meter attached to the indicator will register the light from the LED. If the probe is no longer light tight, and the saturation indicator is saturated, no signal will be registered when the LED is activated.

5 Claims, 1 Drawing Sheet

SCINTILLATION PROBE WITH PHOTOMULTIPLIER TUBE SATURATION INDICATOR

TECHNICAL FIELD OF THE INVENTION

The present invention relates to a photomultiplier tube saturation indicator and specifically to one for use with alpha contamination probes.

BACKGROUND OF THE INVENTION

Photomultiplier tubes are very sensitive light sensors, especially for visible radiation. FIG. 1 is a schematic showing the electrical circuit used to bias the photomultiplier and form the output voltage signal 24. Light is incident on the photocathode 12 having a cathode 22 and an anode 20. The resulting photoelectrons are accelerated to a series of dynodes 14, 16, 18 to generate secondary electrons and through this electron multiplication amplify the signal. Gains of $10^8$ can be achieved with only minor degradation of the linearity and speed of vacuum photodiodes. The spectral response is governed by the emission properties of the photocathode.

There are various types of photomultipliers with different physical arrangements to optimize for specific applications. The high voltage supply ranges from 300 to 3000 V, and the electron multiplication gain is normally adjusted by varying the supply voltage. The linearity of a photomultilpier is very good, typically 3% over three decades of light level. Saturation is normally encountered at high anode currents caused by space charge effects at the last dynode where most of the current is generated. The decoupling capacitors, $C_i$, on the last few dynodes are used for high frequency response to prevent saturation from the dynode resistors.

Scintillation probes all utilize a photomultiplier tube of some type. The photomultiplier tube functions properly as long as the probe is light tight. Gamma scintillation probes provide the light tight integrity with metal canning around the probe. This is acceptable since gamma radiation can penetrate the canning of the probe and get counted. Also a gamma background is present at all times so a positive indication is normally present on the meter. When a light leak occurs in the canning the photomultiplier tube becomes saturated and the meter response goes to zero.

Alpha scintillation probes, however, require a thin mylar covering to allow the alpha particles to enter the probe. An alpha particle is a helium nuclei. A thin mylar covering can effectively block visible light; however, the thin mylar is easily damaged during normal surveys. Alpha background normally does not exist and the meter indicates zero. This is a problem since the lack of a meter response may also be due to the photomultiplier tube being saturated from a light leak. Instrument manufacturers have attempted to solve this problem by using a balanced circuit to detect small changes in the output current of the photomultiplier tube. The balanced circuits have proven to be very unstable and have caused difficulty in calibration of the instrument.

Low level radioactive alpha sources attached to the instrument have been the only reliable method to check for proper operation of the meter. The disadvantages of this method are: 1) the handling and maintenance of the sources with the instrument, 2) the probe must be removed from the survey location to check for a meter response with the source, and 3) the low level alpha source emits few alpha particles in a random pattern so the probe must be held on the source until a positive indication is made.

A need exists for a saturation indicator for an alpha contamination probe which overcomes the disadvantages found in the prior art.

SUMMARY OF THE INVENTION

As discussed above, failure of alpha survey instruments are typically caused by small tears or holes in the mylar probe face. These light leaks cause the photomultiplier tube to saturate and stop functioning. The present invention provides a small controlled light source to be introduced directly to the photomultiplier tube. The normal meter circuits connected to the probe should indicate an upscale response when the light is activated. If the photomultiplier tube is saturated, the light will not produce a response.

This circuit has several advantages. The circuit, unlike the manufacturer's circuit, is reliable and easily maintained. The circuit does not interfere with the calibration of the instrument. The circuit is easily installed in the probe with minimum effort. Two other advantages exist over the response check to low level alpha sources. The indication, when the light is actuated, is immediate so the waiting for the statistical emission of an alpha particle is eliminated. The second advantage is the instrument can be checked in the position and location being surveyed. This is an advantage when the source and its holder may block a light leak and therefore, provide a false response check. It is also an advantage when the surveyor does not want to lose the exact position of the probe during a survey to perform a source response check.

It should be noted that this invention will not eliminate the daily source check to a known value alpha source. This check will still be needed to ensure the meter is responding accurately as it was when the instrument was calibrated. However, one source can now be used by many :meters and the source can be centrally located and controlled.

BRIEF DESCRIPTION OF THE DRAWINGS

The novel features believed to be characteristic of the invention are set forth in the appended claims. For a more complete understanding of the present invention, and for further details and advantages thereof, reference is now made to the following Detailed Description taken in conjunction with the accompanying drawings, in which:

DETAILED DESCRIPTION OF THE PREFERRED EMBODIMENT

Figure 1:
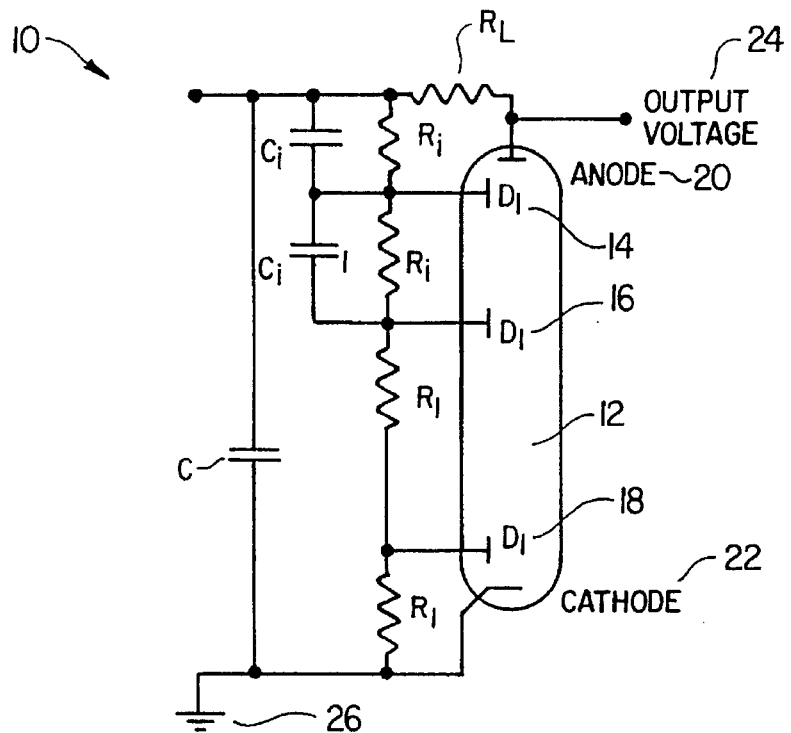
FIG. 1 is a prior art photomultiplier tube.
Figure 2:
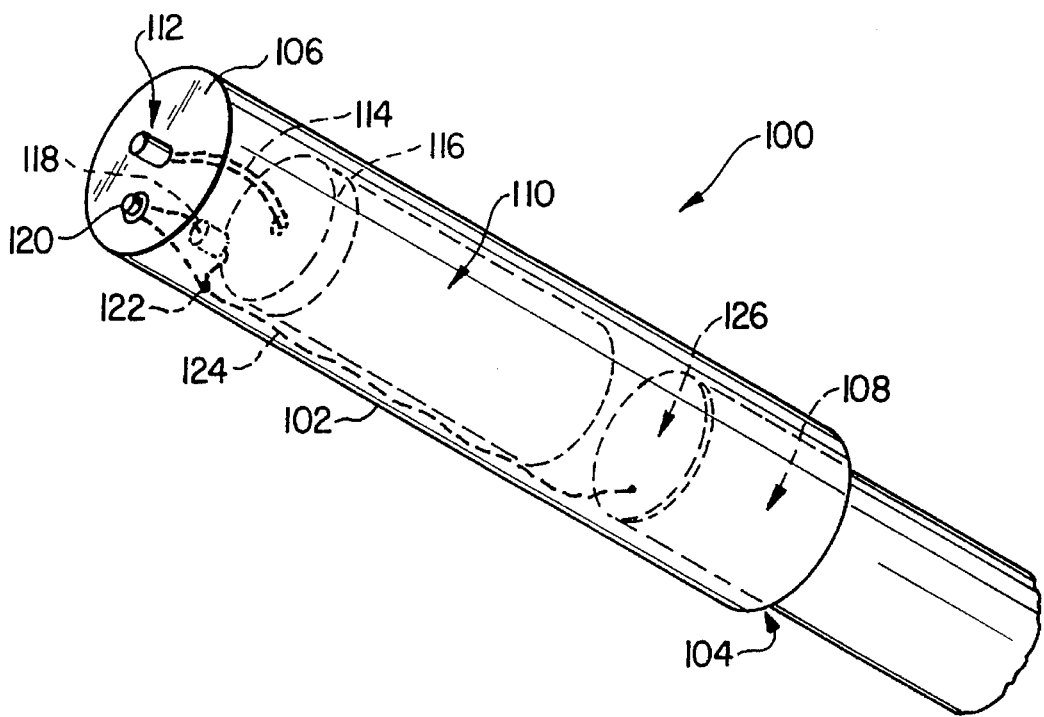
FIG. 2 is a perspective view of the present photomultiplier tube saturation indicator.

The present invention provides a user the ability to check for saturation of the photomultiplier tube by visible light due to a light leak. FIG. 2 illustrates the circuit 100 of the present invention. The saturation indicator circuit 100 includes a tube 102 with a closed end 106 and an open end 104. A light pipe 108 can enter the tube's open end 104. A photomultiplier tube 110 is captured between the light pipe 108 and the closed end 106. A probe connector 112 is attached to the closed end 106 and is attached to the photomultiper tube 110 by a wire 114. The wire 114 extends between the connector 112 and a tube socket 116 which is connected to one end of the photomultiplier tube.

A light emitting diode 122 is inserted into the tube 102 between the tube socket 116 and the closed end 106. A battery 118, also held in said tube, is operably connected to the LED 122. A switch 120 is mounted on the probe and is used to close the circuit between the battery 118 and the light emitting diode 122. The LED color chosen for a photomultiplier tube type is dependent on the sensitivity of the photomultiplier tube to the particular light wavelength. The LED 122 is optically coupled with the photomultiplier tube with an optical fiber 124. The optical fiber 124 and LED are preferably sealed together with a piece of shrink wrap tubing. The optical fiber 124 and the photomultiplier tube 110 are coupled using the existing coupler grease 126 between the probe light pipe and the photomultiplier tube.

A method of making the probe involves installing the circuit inside the probe. The switch is mounted at a convenient location on the back of the probe. The batteries and LED are installed in spare space inside the probe. Typically this would be in the shock foam padding used to secure the photomultiplier tube. The optical fiber is threaded along the photomultiplier tube and inserted into the coupler grease.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the appended claims.

What is claimed is:

1. A scintillation probe with photomultiplier tube saturation indicator comprising:
   (a) a light impervious tube with a closed end and an open end for accepting a light pipe;
   (b) a photomultiplier tube captured within the light impervious tube between the light pipe and the closed end;
   (c) a light source adjacent to the photomultiplier tube;
   (d) a switchable power supply connected to said light source wherein the power supply operates independently from the output of the photomultiplier tube; and
   (e) a means for measuring the output of the photomultiplier tube when light from the light source is applied to the photomultiplier tube for determining whether the photomultiplier tube is saturated.

2. The scintillation probe of claim 1 further comprising:
   (f) an optical fiber between said light source and said light pipe.

3. The scintillation probe of claim 1 wherein said light source comprises a light emitting diode.

4. The scintillation probe of claim 1 wherein said switchable power supply comprises a battery connected to a switch wherein said switch is mounted to the closed end of the tube.

5. The scintillator probe of claim 2 wherein the optical fiber and the light source are sealed together with shrink wrap tubing.

\* \* \* \* \*